US011554274B2

(12) United States Patent
Spasiano et al.

(10) Patent No.: US 11,554,274 B2
(45) Date of Patent: Jan. 17, 2023

(54) MODULAR AND ORIENTABLE EMERGENCY EVACUATION SYSTEM

(71) Applicant: PROGETECH S.R.L., Rome (IT)

(72) Inventors: Matteo Spasiano, Rome (IT); Francesco Geri, Rome (IT)

(73) Assignee: PROGETECH S.R.L., Rome (IT)

( * ) Notice: Subject to any disclaimer, the term of this patent is extended or adjusted under 35 U.S.C. 154(b) by 264 days.

(21) Appl. No.: 16/633,551

(22) PCT Filed: Jul. 25, 2018

(86) PCT No.: PCT/IT2018/050138
§ 371 (c)(1),
(2) Date: Jan. 23, 2020

(87) PCT Pub. No.: WO2019/021332
PCT Pub. Date: Jan. 31, 2019

(65) Prior Publication Data
US 2020/0206541 A1    Jul. 2, 2020

(30) Foreign Application Priority Data
Jul. 27, 2017    (IT) .......................... 102017000086155

(51) Int. Cl.
*A62B 1/20*      (2006.01)
*B64D 25/14*    (2006.01)
*B63B 43/00*    (2006.01)

(52) U.S. Cl.
CPC ............... *A62B 1/20* (2013.01); *B64D 25/14* (2013.01); *B63B 2043/003* (2013.01)

(58) Field of Classification Search
CPC ............... A62B 1/20; B63B 2043/003; B63B 2027/145; B64D 25/14
See application file for complete search history.

(56) References Cited

U.S. PATENT DOCUMENTS 279,175 A * 6/1883 Meyer ...................... A62B 1/20
182/49
3,811,534 A * 5/1974 Fisher ....................... A62B 1/20
182/48

(Continued)

FOREIGN PATENT DOCUMENTS

CA          2369188 A1    7/2003
CN       203139428 U      8/2013

(Continued)

OTHER PUBLICATIONS

Search Report issued in IT Patent Application No. 102017000086155, dated Mar. 19, 2018, in 10 pages.

(Continued)

*Primary Examiner* — Colleen M Chavchavadze
(74) *Attorney, Agent, or Firm* — Knobbe, Martens, Olson & Bear, LLP

(57) ABSTRACT

Described is a system for the emergency evacuation of persons from a structure, such as a building, ship, raised platform, stadium or the like, comprising supporting means, designed to be positioned at a window of said structure for the emergency evacuation from said structure; at least one load-bearing structure, coupled with said supporting means, comprising in turn a plurality of modules, each comprising two inflatable longitudinal tubular elements positioned parallel to each other, said modules being positioned in series with each other; a slide having a surface on which the persons evacuated from said structure can slide, said slide being interposed between said two inflatable longitudinal tubular elements of said modules; and a pneumatic inflation system for the selective inflation of said two inflatable longitudinal tubular elements of said modules.

18 Claims, 8 Drawing Sheets

(56) References Cited

U.S. PATENT DOCUMENTS

| | | | | |
|---|---|---|---|---|
| 4,378,861 | A | * | 4/1983 | Burrough ............... B64D 25/14 182/48 |
| 4,434,870 | A | * | 3/1984 | Fisher ..................... A62B 1/20 182/48 |
| 4,602,697 | A | * | 7/1986 | Aanensen ................ A62B 1/20 182/48 |
| 5,311,706 | A | * | 5/1994 | Sallee ..................... E04C 3/005 52/2.18 |
| 8,376,082 | B2 | * | 2/2013 | Grainger ............... E01D 15/122 182/48 |
| 9,394,041 | B2 | | 7/2016 | Hilbert et al. |
| 10,112,063 | B1 | * | 10/2018 | White .................... G08B 25/12 |
| 10,377,499 | B2 | * | 8/2019 | Volny .................... B64D 25/14 |
| 2003/0085567 | A1 | | 5/2003 | Oney et al. |
| 2012/0100765 | A1 | * | 4/2012 | Simon Bouhet .......... B63C 9/22 441/39 |
| 2017/0246483 | A1 | * | 8/2017 | Riccione .................. A62B 1/20 |
| 2019/0276156 | A1 | * | 9/2019 | Boyer ..................... A62B 1/20 |

FOREIGN PATENT DOCUMENTS

| | | | |
|---|---|---|---|
| CN | 104271438 A | | 1/2015 |
| CN | 205323036 U | | 6/2016 |
| DE | 19715597 A1 | | 10/1998 |
| EP | 1306304 A1 | | 5/2003 |
| EP | 2440446 B1 | | 6/2013 |
| EP | 3124383 A1 | | 2/2017 |
| GB | 2061847 A * | 5/1981 | ............. B64D 25/14 |
| GB | 2131369 A * | 6/1984 | ............... B63C 9/00 |

OTHER PUBLICATIONS

International Search Report and Written Opinion of the International Searching Authority for International Application No. PCT/IT2018/050138, dated Nov. 19, 2018, in 16 pages.

* cited by examiner

Lorem ipsum

MODULAR AND ORIENTABLE EMERGENCY EVACUATION SYSTEM

CROSS-REFERENCE TO RELATED APPLICATIONS

This application is the U.S. National Phase under 35 U.S.C. § 371 of International Application PCT/IT2018/050138, filed Jul. 25, 2018, which claims priority to IT Application No. 102017000086155, filed Jul. 27, 2017, the entire contents of each of which are incorporated by reference herein and made a part of this specification.

SUMMARY

This invention relates to a modular and orientable emergency evacuation system.

More in detail, the invention relates to an emergency evacuation slide, designed and manufactured in particular for allowing, in the event of a fire, chemical attack, terrorist attack, earthquake or others, the escape from windows, balconies, terraces and the like of high buildings, but also from a ship, raised platform, stadium or the like.

The following description refers to the application to windows of buildings, but it is clear that it must not be considered to be limited to this specific use.

As is currently well known, in the event of an emergency in a building or structure with several storeys or raised sites in urban areas, the persons present on the upper floors may not be able to reach the lower floors, due to inaccessibility of traditional escape routes or due to temporary or permanent disabilities or motor impairments, as well as not being protected against the effects of smoke inhalation, poor visibility and panic.

In these situations the Fire Service personnel climb up telescopic ladders to reach the windows and rescue the persons. This operation takes a very long time and does not therefore guarantee a sufficient evacuation capacity such as to ensure the fast rescue of the occupants of the buildings.

Currently, with reference to multi-storey buildings, the traditional escape routes consist of emergency stairways; these stairways, by their very nature, constitute an architectural barrier for people with disabilities and they therefore represent an unresolved problems for rescuing the above-mentioned persons or persons with temporary disabilities.

For this reason, when there is a large number of persons to be evacuated, preference is given to slides or suitable devices which are able to facilitate the descent of persons and make it faster. An example of an inflatable device is described in the European patent application EP 2858724 A, in the name of the same Applicant, in which a description is given of inflatable slides of both a spiral and linear shape, which are able to allow a fast evacuation in the event of a fire or imminent danger.

The relevant prior art also comprises patent applications EP 1306304 A1 and US 2003/085567 A1.

A drawback of the devices and the systems in general, according to the prior art, is represented by the fact that the known devices and systems are neither applicable to the building nor orientable in real time according to the actual height and the actual positioning of the window or balcony or door to which they must be applied.

Another drawback is represented by the fact that a non-modular system is unable to be adjusted, except solely with regard to its inclination, on the basis of the various floors to be evacuated, making it impossible to use the same slide to evacuate, for example, a first and a third floor, or a second and a fourth floor.

Moreover, a modular system, both in the fixed mode on a building, and in the mobile mode (applicable by means of universal hooks to the cornice, terrace or other), is in any case necessary in order to maintain a pressure and an optimum rigidity of the structure which, otherwise, would tend to lose some structural quality beyond a certain length.

Another drawback of the prior art, represented by the impossibility to adjust the inclination of the of the surface which supports the persons during sliding, with respect to the ground, can cause difficulties of various types (fear, hesitancy and others) such as to determine the slowing down of the rescue operations with persons who have fear of heights and high places, such as, for example, people who suffer from acrophobia.

There are also, naturally, non-inflatable structures, but, as they are very heavy, they are inconvenient, bulky and therefore difficult to transport.

Another problem of significant importance is represented by many historical buildings which, due to the constraints to which they are subjected, are not provided with escape systems which are perfectly adequate for the capacity of persons to be evacuated. In fact, since it is not possible to position the fire escape ladders on the external facades, it is necessary to position them inside the atrium which, according to the regulations, is not a "safe place".

This shortcoming is usually dealt with by "equivalent safety measures", which are each time the object of derogations to the current requirements specified by the relative standards.

Lastly, in the case of evacuation from historical buildings, it is often very complicated to carry out rescue operations, also due to the reduced spaces surrounding the buildings and the high risks of adversely affecting or ruining the historical heritage.

It is evident how the prior art solutions can present serious problems in terms of social and economic aspects.

In light of the above, it is therefore the aim of the invention to provide a linear inflatable slide which is modular, can be oriented and can be anchored to the ground which overcomes the problems of the prior art.

Another aim of the invention is to be able to anchor the slide to the ground allowing the correct inclination to be always maintained as well as the correct angle between the various modules of the slide even under the effects of the stresses caused by the weight of the persons during the evacuation.

Lastly, another aim of the invention is to provide an inflatable linear slide in which it is possible to adjust the height which can be reached by inflating the various modules, maintain a speed of sliding controlled by the inclination of the sliding surface with respect to the ground by the fixing to the ground of said slide and reaching heights greater than that of non-modular systems.

The specific object of the invention is therefore a system for the emergency evacuation of persons from a structure, such as a building, ship, raised platform, stadium or the like, comprising supporting means, designed to be positioned at a window of said structure for the emergency evacuation from said structure, at least one load-bearing structure, coupled with said supporting means, comprising in turn a plurality of modules, each comprising two inflatable longitudinal tubular elements positioned parallel to each other, said modules being positioned in series with each other, a slide having a surface on which the persons evacuated from said structure can slide, said slide being interposed between said two inflatable longitudinal tubular elements of said modules, and a pneumatic inflation system for the selective inflation of said two inflatable longitudinal tubular elements of said modules.

Further, according to the invention, said supporting means comprise an upper platform which can be fixed to said supporting structure and a lower platform which can be coupled to said upper platform.

Preferably, according to the invention, said lower platform can be coupled to said upper platform by means of rotatable coupling elements.

Also, according to the invention, said rotatable coupling elements comprise a pin fixed on said upper platform(.

Further, according to the invention, said supporting means comprise a hook which can be coupled to said lower platform for resting said system on the structure.

Preferably according to this invention, said lower platform is integral with said structure.

Also, according to the invention, said slide extends from said first module on said successive modules uninterruptedly.

Further, according to the invention, each module comprises at least two inflatable transversal tubular elements positioned parallel to each other.

Preferably, according to the invention, each of the inflatable longitudinal tubular elements is equipped with a respective valve which can be connected to said pneumatic inflation system for the entrance of an inflating fluid.

Also, according to the invention, each of the inflatable longitudinal tubular elements of said first module is provided, respectively, with an inflation valve, which can be connected to said pneumatic inflation system for the entrance of an inflating fluid, between each of the inflatable longitudinal tubular elements of the modules after the first module is interposed a passive inflating valve, designed to open after a predetermined pressure threshold is exceeded, such as to allow the sequential inflation of said inflatable longitudinal tubular elements, and in that said pneumatic inflation system is configured for inflating in a selective manner said plurality of modules in succession one after the other, starting from said first tubular module.

Further, according to the invention, each of the inflatable longitudinal tubular elements comprises an inflation valve, which can be connected to said pneumatic inflation system, and each of the inflatable transversal tubular elements comprises an inflation valve, which can be connected to said pneumatic inflation system.

Preferably, according to the invention, for each module, said two inflatable longitudinal tubular elements and said two inflatable transversal tubular elements are in communication with each other, and each module is equipped with an inflation valve which can be connected to said pneumatic inflation system.

Also, according to the invention, each module comprises supporting elements positioned on the rear surface of the slide, communicating with said two inflatable longitudinal tubular elements and said two inflatable transversal tubular elements.

Further, according to the invention, each of the inflatable longitudinal tubular elements of the first module comprise an inflation valve which can be connected to said pneumatic inflation system, each of the inflatable transversal tubular elements of the first module comprise an inflation valve which can be connected to said pneumatic inflation system, each of the inflatable longitudinal tubular elements of the modules after the first module is interposed a passive inflation valve, designed to open after a predetermined pressure threshold is exceeded, such as to allow the sequential inflation of both said inflatable longitudinal tubular elements and said inflatable transversal tubular elements, said pneumatic inflation system is configured for inflating in a selective manner said plurality of modules in succession one after the other, staring from said first module.

Preferably, according to the invention, each module comprises two inflatable transversal tubular elements positioned parallel to each other, said slide comprises a plurality of portions each portion being positioned between the respective inflatable longitudinal tubular elements, each module being connected to the next by coupling elements such as rings, and/or hooks, and/or Velcro elements fixed to each inflatable transversal tubular element.

Also, according to the invention, for each module, said two inflatable longitudinal tubular elements and said two inflatable transversal tubular elements are in communication with each other, and each module is equipped with an inflation valve which can be connected to said pneumatic inflation system.

Further, according to the invention, each of the inflatable longitudinal tubular elements comprises an inflation valve, which can be connected to said pneumatic inflation system, and each of the inflatable transversal tubular elements comprises an inflation valve, which can be connected to said pneumatic inflation system.

Preferably, according to the invention, said coupling elements can be fixed to the ground by anchoring means such as nails, weights and the like.

Also, according to the invention, said pneumatic inflation system comprises at least one cylinder comprising the inflating fluid and at least one electronic unit for controlling the dispensing of said inflating fluid.

Further, according to the invention, said slide is made of fireproof material, and said load-bearing structure may be surrounded either entirely or partially by a cover made of fireproof material.

BRIEF DESCRIPTION OF THE DRAWINGS

The invention is now described, by way of example and without limiting the scope of the invention, according to its preferred embodiments, with particular reference to the accompanying drawings, in which.

The similar parts will be indicated in the various drawings with the same numerical references.

DETAILED DESCRIPTION

Figure 1:
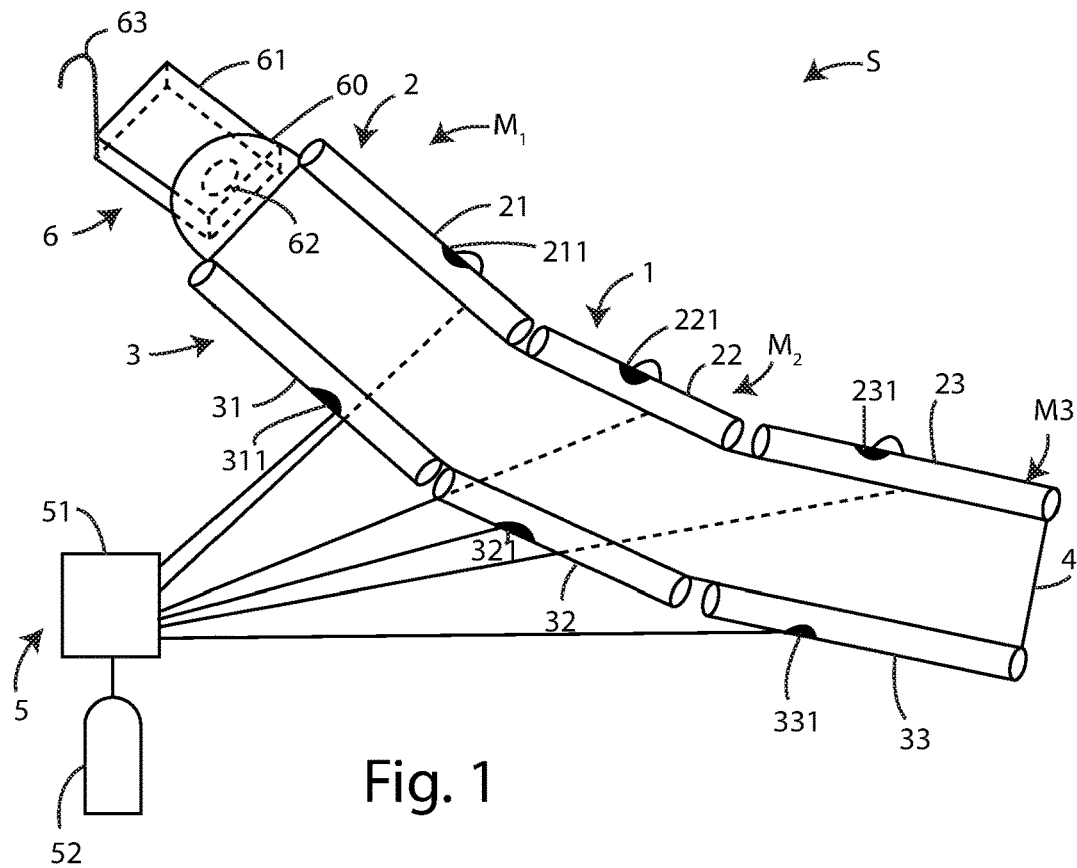
FIG. 1 shows a schematic perspective lateral view of a first embodiment of the emergency evacuation system according to the invention.

With reference to FIG. 1, the emergency evacuation system S according to the invention is applied to a structure, in particular a building P, having a predetermined height with respect to the ground, and comprising windows F and can be transported from the inside to the outside of the structure, from one window F to another, by means of a support equipped with wheels or rolling means, such as, for example, a carriage. This method of use is defined as mobile mode.

Said emergency evacuation system S according to the invention can also be built into or integral with the structure, in particular a building P, which can always comprise windows F, and also balconies or other elements. This method of use is defined as fixed mode.

The system S comprises a load-bearing structure 1, comprising in turn a plurality of modules $M_1$-$M_n$, positioned in series one after the other. Each module $M_1$-$M_n$, comprises two inflatable longitudinal tubular elements 21-31, 22-32, 23-33, . . . positioned parallel to each other, a slide 4 interposed between said two inflatable longitudinal tubular elements 21-31, 22-32, 23-33, . . . of each module $M_1$-$M_n$, a pneumatic inflation system 5 and means 6 for supporting said system S to the structure P.

The accompanying drawings show systems comprising three modules, but it is clear that the number of modules $M_1$-$M_n$ may, as necessary, be more or less, depending on the height of the building P to be evacuated or the height of the window F above the ground to which the system S is applied.

Each of the inflatable longitudinal tubular elements 21-31, 22-32, 23-33, . . . is equipped with a respective valve 211-331 which can be connected to said pneumatic inflation system 5 for the entrance of an inflating fluid.

As can be seen in the embodiment illustrated in FIG. 1, each tubular element has its own inflation valve 211-331.

The slide 4 extends from said first module $M_1$ to the successive modules $M_2$-$M_n$, positioned in series with each other, in an uninterrupted fashion and allow the sliding of the persons to be rescued during a disaster or a fire. Said slide 4 is made of fireproof material.

Said load-bearing structure 1 may be surrounded by a cover C, gain made of fireproof material. Said cover C can, if necessary, cover only a portion of the load-bearing structure 1 or can cover it entirely.

Depending on the number of modules $M_1$-$M_n$ which are inflated, the inclination of said slide 4 with respect to the ground can vary opportunely.

Figure 3:
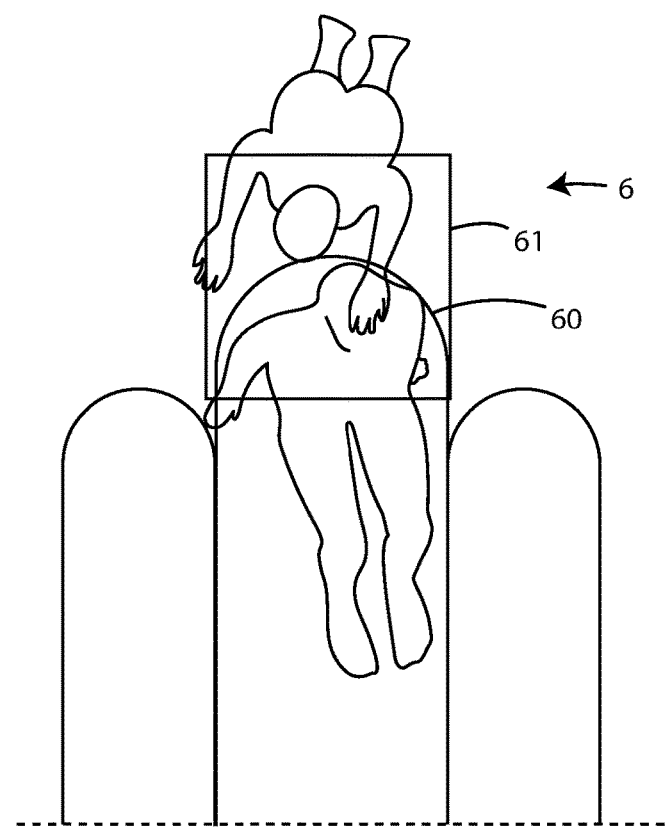
FIG. 3 shows a transparent schematic view of a detail of the evacuation system according to the invention.
Figure 4:
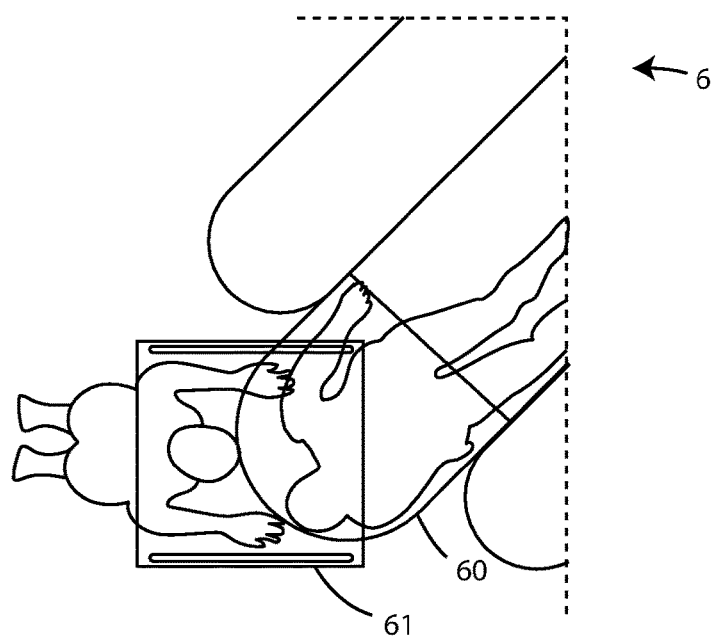
FIG. 4 shows a further transparent schematic view of a detail of the evacuation system according to the invention.
Figure 5:
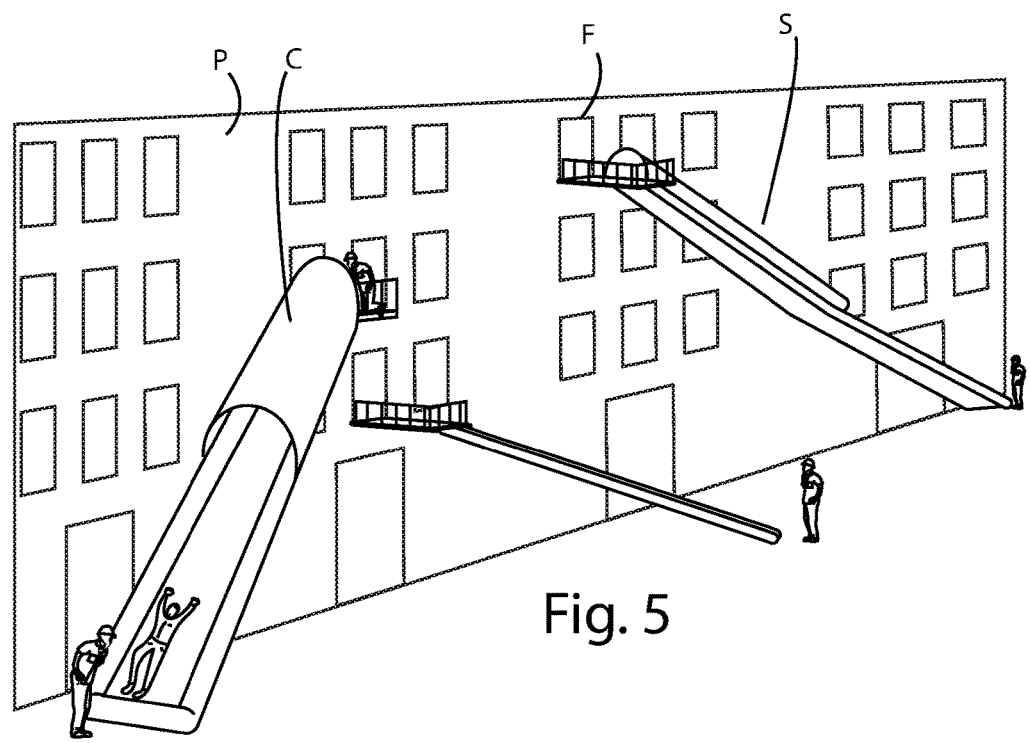
FIG. 5 shows the application of three emergency evacuation systems according to the invention to a three-storey building.
Figure 6:
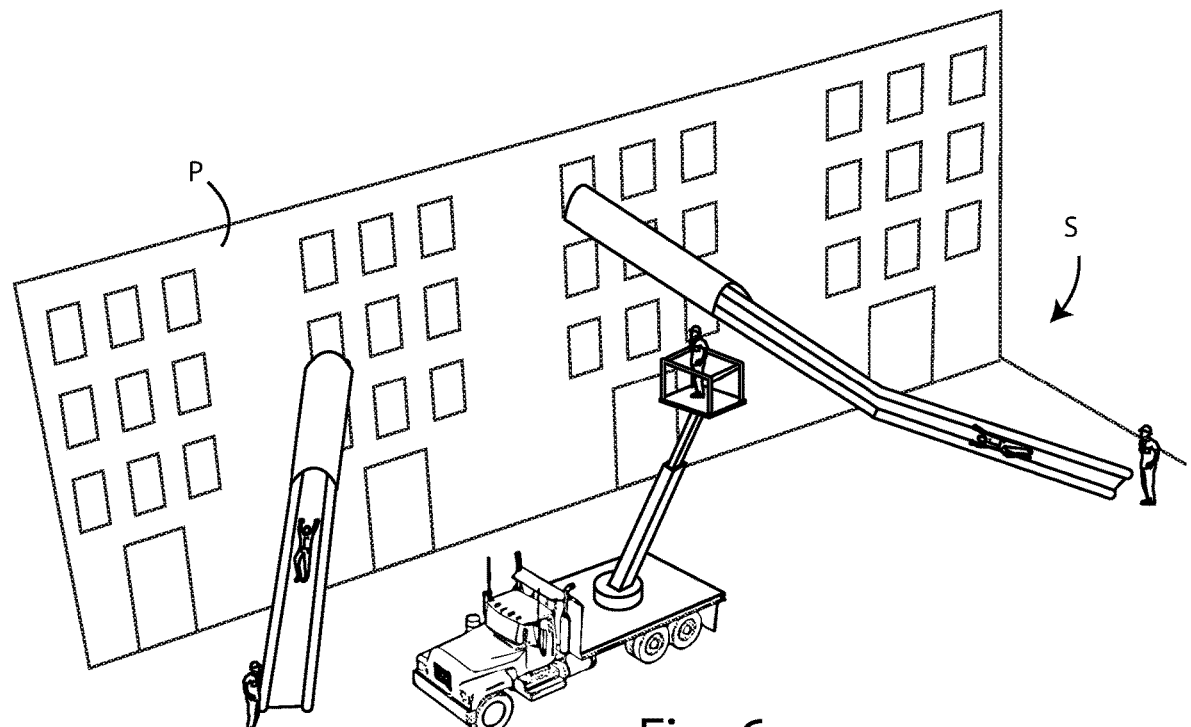
FIG. 6 shows the application of two emergency evacuation systems according to the invention to a three-storey building.

With reference to FIGS. 3 and 4, it should be noted that the supporting means 6 comprise an upper platform 60, which can be fixed to said supporting structure 1, and a lower platform 61, which can be coupled to said upper platform 60.

In the mobile mode described above, said lower platform 61 is applied in a removable fashion to the window F of the building P by a hook 63.

In the fixed mode, on the other hand, said lower platform 61 is integral and integrated with the building P.

Both for the fixed mode and for the mobile mode, said supporting means 6 can also comprise rotary coupling elements 62 such as a pin 62 fixed to the upper end of said slide 4, around which said lower platform 61 is coupled in a rotary fashion.

Said pin 62 couples in a rotary fashion said lower platform 61 and said upper platform 60, in such a way that the slide 4 can rotate when it is fixed to the window F of the building P to be evacuated.

In this way it is possible to orient and place alongside said slide 4 and therefore the entire load-bearing structure 1, with respect to said building P, in the most suitable position with respect to the environment surrounding the building P to be evacuated. This allows, for example, to take into account the presence of other buildings, monuments, tress, walls, traffic lights, signs and the like, which could render the installation of the system S difficult, as shown in FIGS. 5-8.

Said hook 63 has the shape of a gripping device, so that it can be easily rested on the sill of the window F of the building P to be evacuated or, alternatively, on any balcony or the like.

Said pneumatic inflation system 5 comprises an electronic unit 51, operatively connected to said valves 211-331, and at least one cylinder 52 for inflating said modules $M_1$-$M_n$.

Each valve 211-331 is of the pressure difference type which opens initially by means of the inflating fluid and a pressure difference is then set up between the outside and the inside of the inflatable tubular elements.

This pressure difference set up causes the passage of the air surrounding the system from the outside to the inside of the inflatable tubular elements, until the pressure difference is zero and, therefore, until the complete inflation of the inflatable tubular elements.

Said pneumatic inflation system 5 may also comprise several cylinders and is also used for the rapid deflation of said modules $M_1$-$M_n$, in such a way as to adapt the dimensions of said load-bearing structure 1 to the height of the window F to which the system S is applied.

Figure 2:
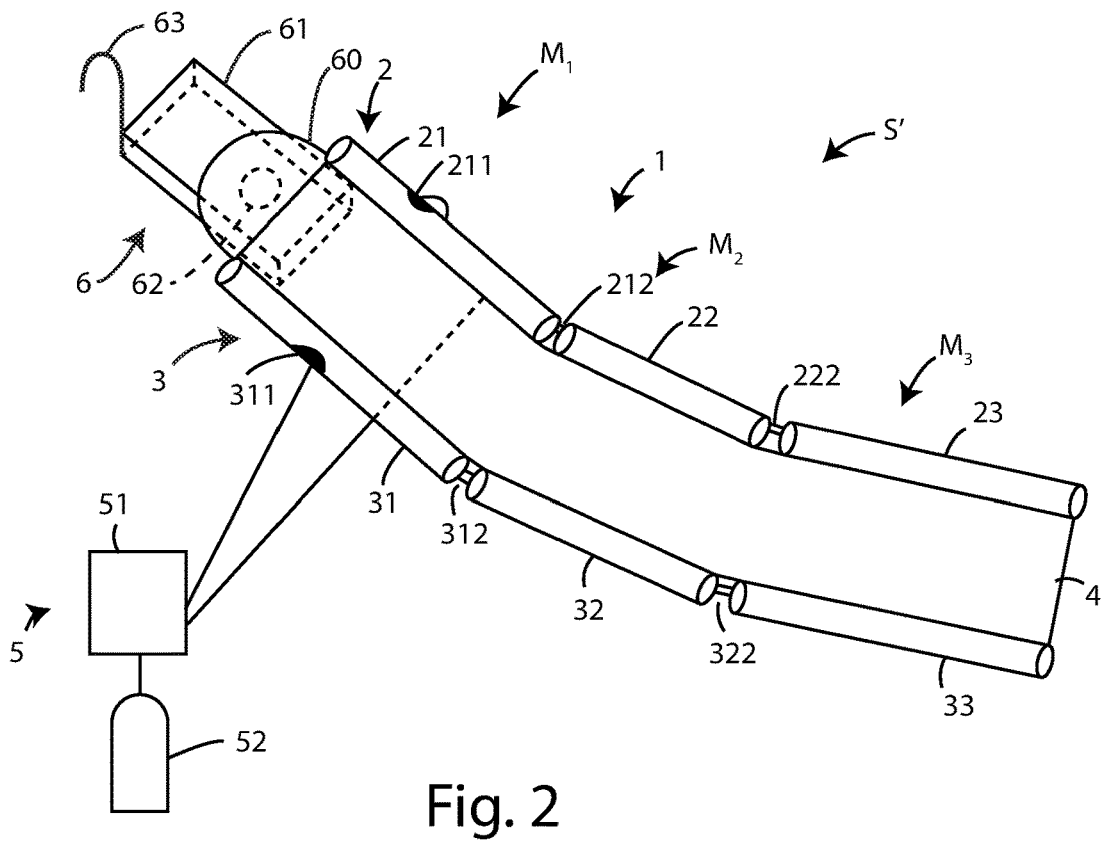
FIG. 2 shows a schematic perspective lateral view of a second embodiment of the emergency evacuation system according to the invention.

According to a first embodiment of the system S, said pneumatic inflation system 5 inflates the inflatable parts of said system S, which in the embodiment shown in FIGS. 1 and 2 are the inflatable longitudinal tubular elements 21-31, 22-32, 23-33, by means of the inflating fluid which is typically compressed air.

According to a second embodiment, said pneumatic inflation system 5, of known type, comprises a cylinder 52 in which the inflating fluid is nitrogen, or nitrogen with the addition of $CO_2$, or other gaseous mixtures, connected to the valves 211-331. A suction device (not shown in the drawings) sucks the surrounding air in such a way as to inflate the longitudinal elements 21-31, 22-32, 23-3 of said 3 system S.

Figure 7:
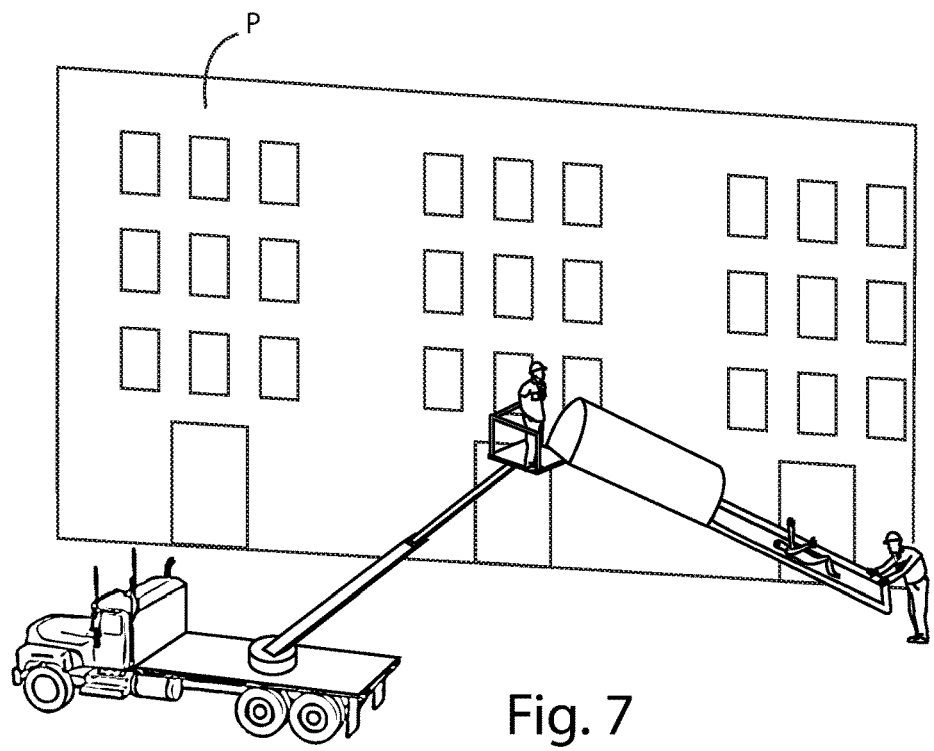
FIG. 7 shows a single emergency evacuation system.
Figure 8:
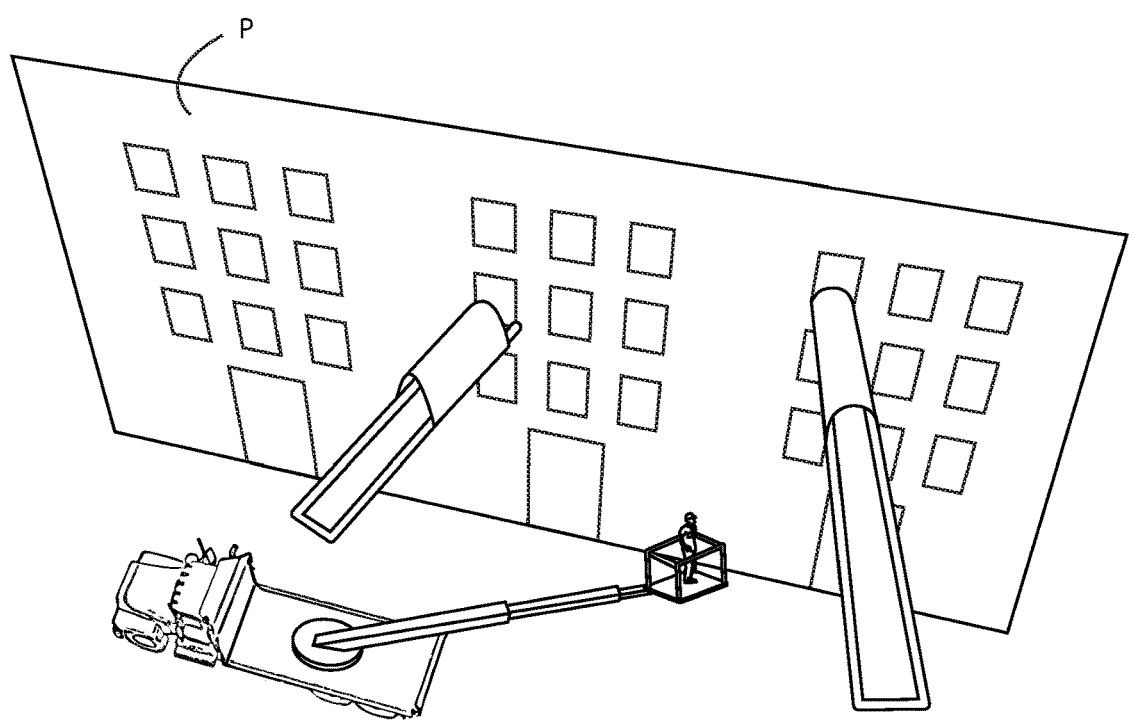
FIG. 8 shows a detail from above of FIG. 7.

As shown in FIG. 7, said system S can be fixed directly on the ladder cages of the vehicles used by the Fire Service.

In a second embodiment of the system S' according to the invention, shown in FIG. 2, the longitudinal tubular elements 21-31 of each module are connected hydraulically to the adjacent tubular element.

Each of the inflatable longitudinal tubular elements 22-33 of the modules $M_2$-$M_n$ after the first module is interposed a passive inflating valve 212-322, designed to open after a predetermined pressure threshold is exceeded, such as to allow the sequential inflation of said inflatable longitudinal tubular elements 22-33.

For this reason, said pneumatic inflation system 5 inflates in a selective manner said plurality of modules $M_2$-$M_n$ in succession one after the other, starting from said first tubular module $M_1$.

Figure 9:
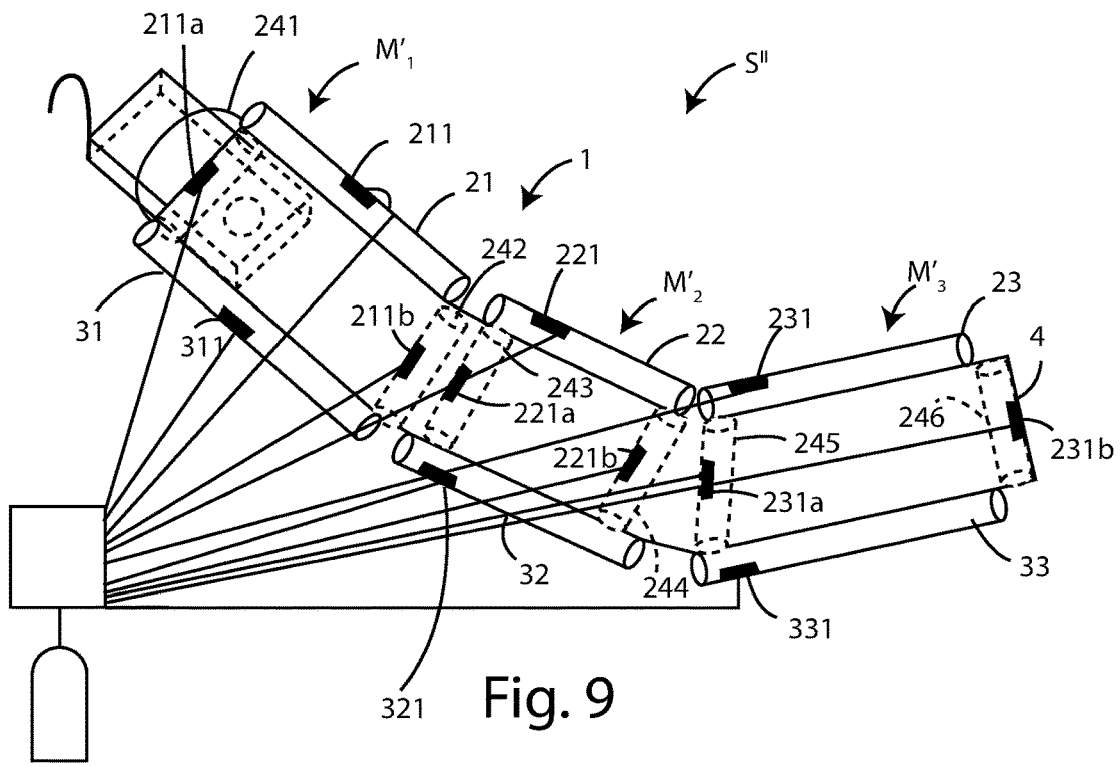
FIG. 9 shows a schematic perspective lateral view of a third embodiment of the emergency evacuation system according to the invention.

According to a third embodiment of the system S", according to the invention, shown in FIG. 9, each module M'$_1$-M'$_n$ also comprises, with respect to the previous systems, two inflatable transversal tubular elements 241-246 positioned parallel to each other at the ends, designed mainly to reinforce the overall structure of the module M'$_1$-M'$_n$.

In this case, each of the inflatable transversal tubular elements 241-246 also comprises an inflation valve 211$_a$-231$_b$, which can be connected to said pneumatic inflation system 5.

Figure 10:
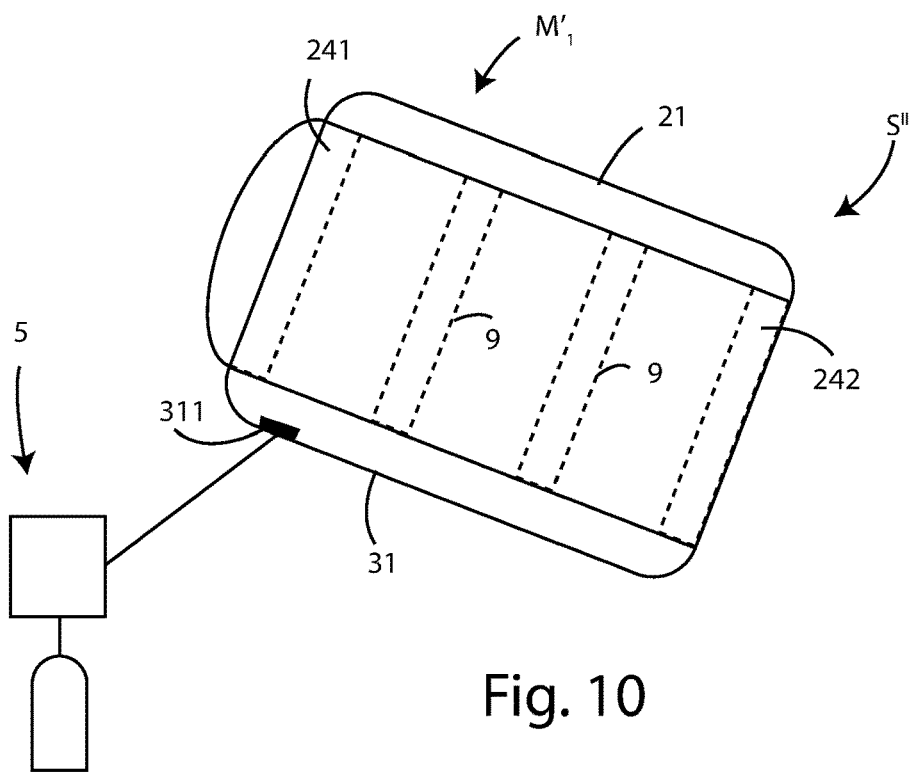
FIG. 10 shows a schematic perspective lateral view of a variant of a detail of FIG. 9.

Alternatively, as shown in FIG. 10, said inflatable transversal tubular elements 241-246 can communicate with, that is to say, with pneumatic or hydraulic connection, said inflatable longitudinal tubular elements 21-33 and therefore not be provided with respective valves, in such a way as to inflate in said inflatable longitudinal tubular elements 21-33.

Moreover, said system S" may also comprise supporting elements 9 on the rear surface of said slide 4, that is, opposite the sliding surface, to provide structural stiffness to said slide 4 during use.

According to this embodiment of the system S", said supporting elements 9 are in communication, that is, in pneumatic or hydraulic connection, and these also inflate together with said inflatable transversal tubular elements 241-246 and with said inflatable longitudinal tubular elements 21-33.

Figure 11:
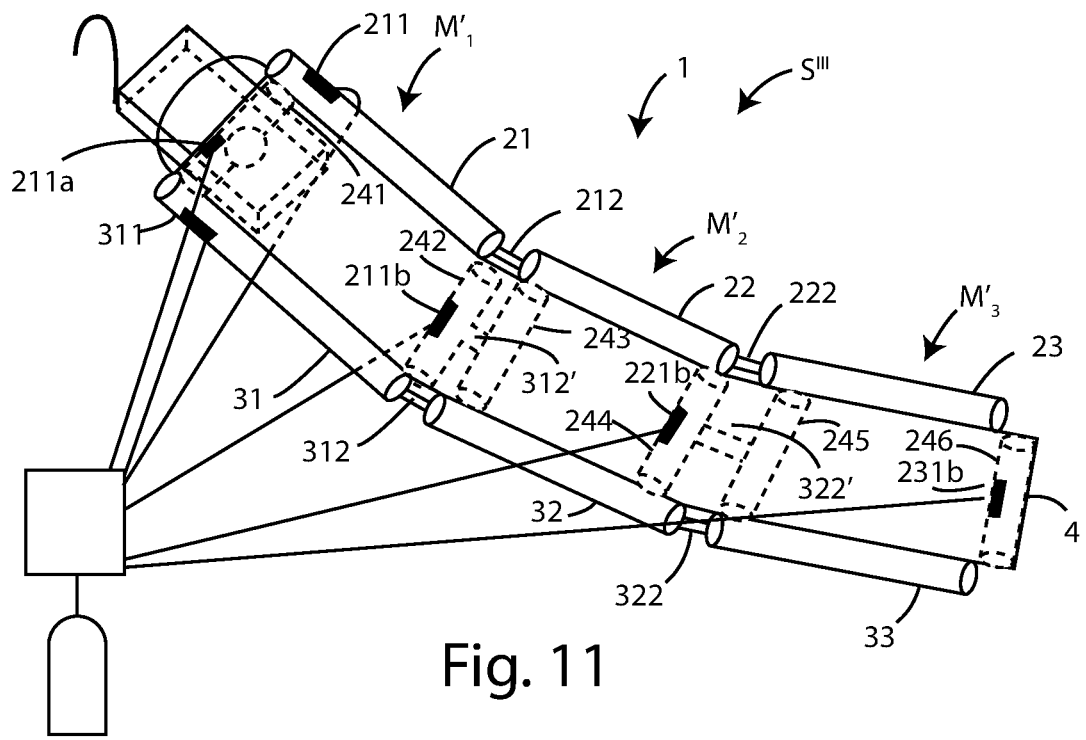
FIG. 11 shows a schematic perspective lateral view of a fourth embodiment of the emergency evacuation system according to the invention.

FIG. 11 shows a fourth embodiment of the system S'" according to the invention, which differs from the first embodiment of the system S described above due both to the presence of inflatable transversal tubular elements 241-246 and the means of inflation, which is similar to the second embodiment of the system S'.

More specifically, each of the inflatable longitudinal tubular elements 21-31 of the first module M'$_1$ comprises an inflation valve 211-311, which can be connected to said pneumatic inflation system 5.

Moreover, the transversal tubular elements 241-246 are also equipped with valves.

More specifically, the two transversal tubular elements 241 and 242 of the first module M'$_1$ are equipped, respectively, with the valves 211$_a$ and 211$_b$, the transversal tubular element 244 of the second module M'$_2$ is equipped with the valve 221$_b$ and the transversal tubular element 246 of the third module M'$_3$ is equipped with the valve 231$_b$.

Moreover, each of the inflatable transversal tubular elements 241-242 of the first module M'$_1$ comprises an inflation valve 211$_a$-211$_b$, which can be connected to said pneumatic inflation system 5.

Between each of the inflatable longitudinal tubular elements 22-33 of the modules M'$_2$-M'$_n$ after the first module is interposed a passive inflating valve 212-322, as described above.

Moreover, between said transversal tubular element 242 and said transversal tubular element 243 is interposed a passive valve 312' and between said transversal tubular element 244 and said transversal tubular element 245 is interposed a passive valve 322'.

Figure 12:
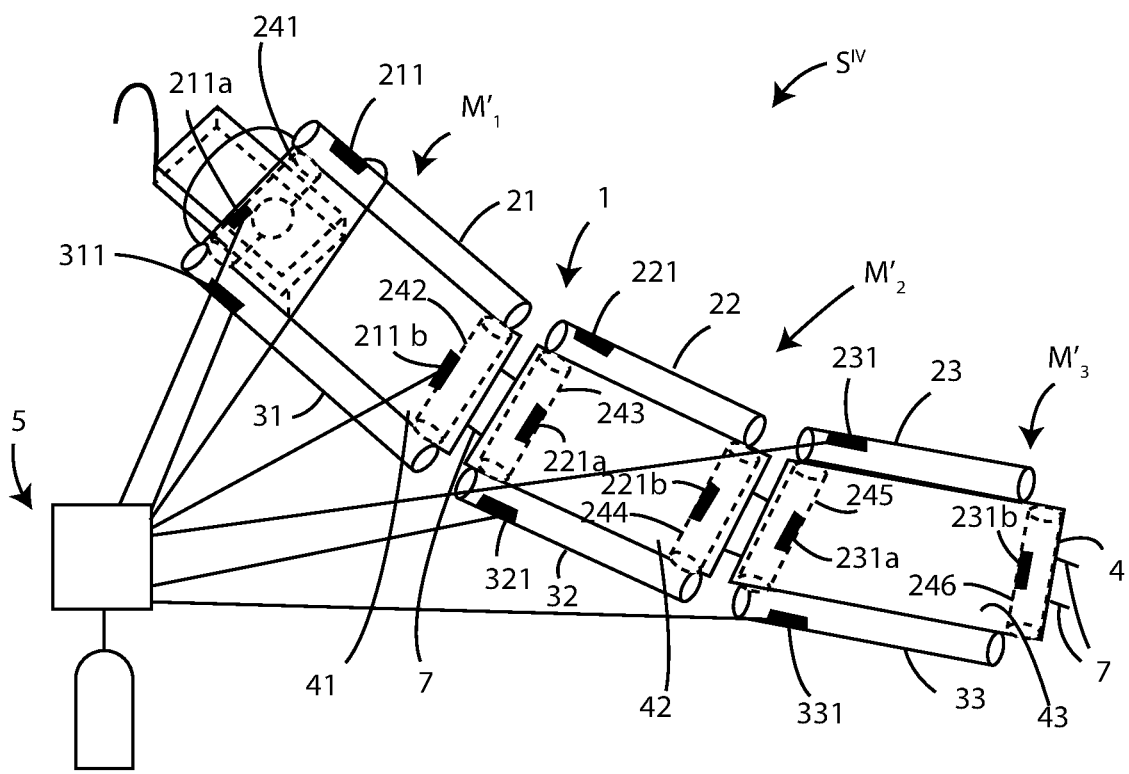
FIG. 12 shows a schematic perspective lateral view of a fifth embodiment of the emergency evacuation system according to the invention.

FIG. 12 shows a fifth embodiment of the system S$^{iv}$ according to the invention, which differs from the first embodiment of the system S described above, due both to the fact that each module M'$_1$-M'$_n$ also comprises two inflatable transversal tubular elements 241-246 positioned parallel to each other and that said slide 4 comprises a plurality of portions 41, 42, 43, . . . each portion being positioned between the respective inflatable longitudinal tubular elements 21-31, 22-32, 23-33, . . . .

According to this embodiment of the system S$^{iv}$, each module M'$_1$-M'$_n$ is connected to the next module in a removable or irremovable fashion by means of coupling elements 7, such as rings or Velcro elements, in such a way as to reach a suitable length which allows the distance of a window or balcony of the building P to be evacuated to be covered.

Figure 13:
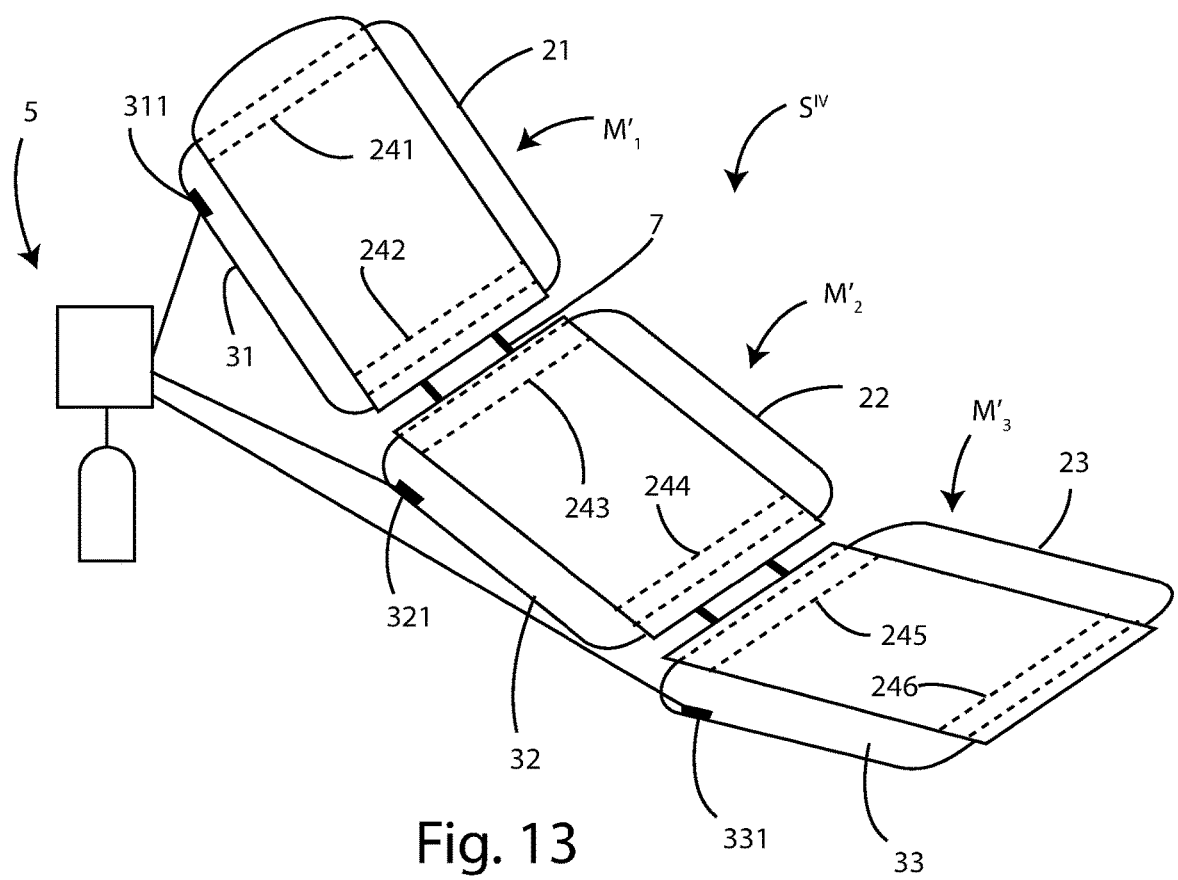
FIG. 13 shows a schematic perspective lateral view of a variant of FIG. 12.

FIG. 13 shows that also for this embodiment of the system S$^{iv}$ the respective longitudinal tubular elements 21-33 and transversal tubular elements 241-246 for each module M'$_1$-M'$_n$ can be in communication, that is, in pneumatic or hydraulic connection, and they are inflated by a single valve 311-331 coupled with said pneumatic inflation system 5.

Said coupling elements 7 can also be positioned on the transversal tubular element 246 of the last module of the third embodiment of the system S" and of the fourth embodiment of the system S'" for fixing to the ground said load-bearing structure 1 by means of anchoring means such as nails, weights and the like, or for adding further modules M'$_1$-M'$_n$ as described in the fifth embodiment of the system S$^{iv}$.

Figure 14:
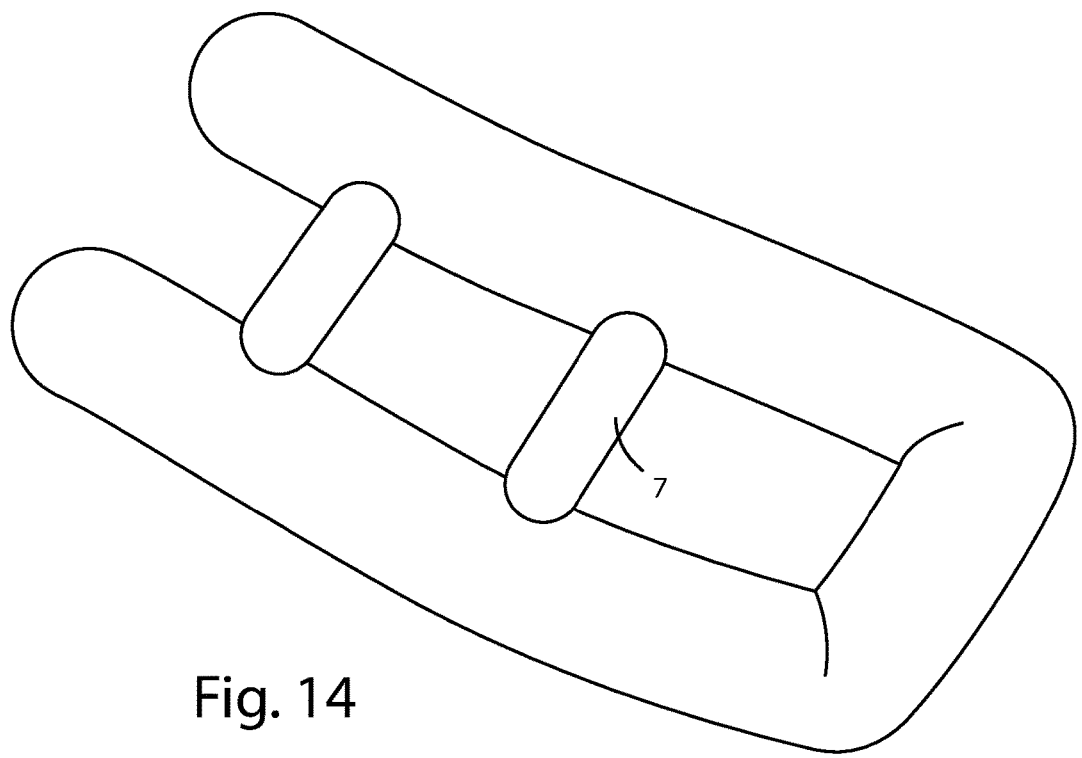
FIG. 14 shows a view from below of the system according to the invention.

With reference to FIG. 14, it is possible, for all the embodiments described above, as already described for the fifth embodiment of the system S$^{iv}$, to also provide supporting elements 9 on the rear surface of said slide 4, that is, opposite the sliding surface, to provide structural stiffness to said slide 4, during use.

Figure 15:
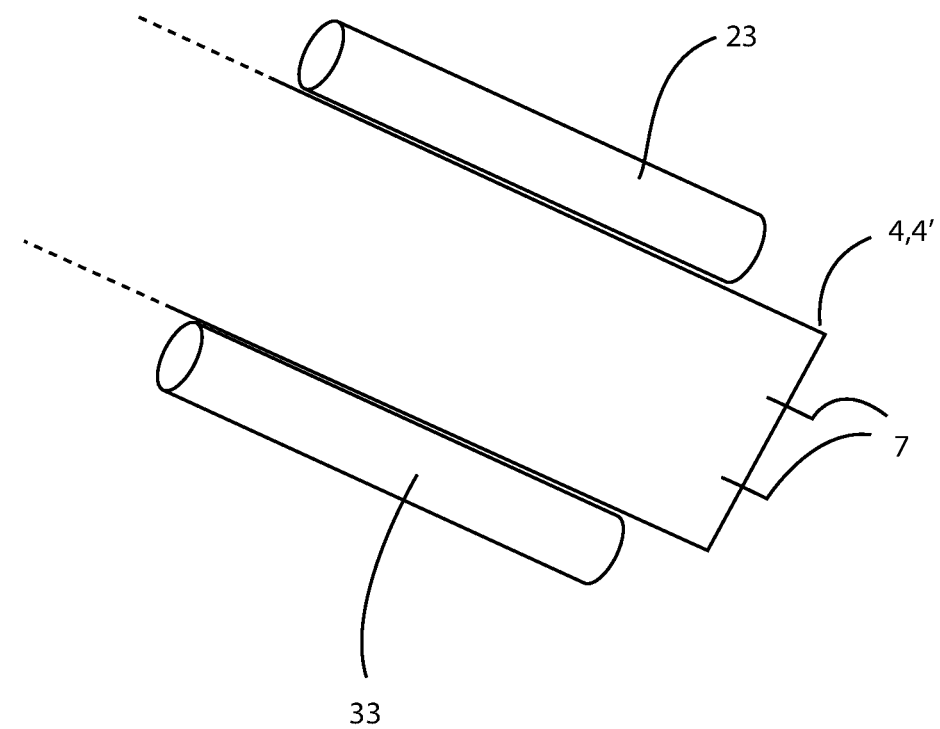
FIG. 15 shows a schematic perspective lateral view of a detail of the system according to the invention.

Lastly, as shown in FIG. 15, it is also possible, for all the embodiments described above, that said slide 4 can have a length which exceeds the length of said inflatable longitudinal tubular elements 23-33 and can be provided with said coupling elements 7 in such a way that, if one or more modules are added, said excess part of said slide 4 couples with a portion of the slide 4 in the next module.

Moreover, for all the embodiments described above, said coupling elements 7, when they are fixed to the ground, allow the overall angle of inclination of said slide 4 to be varied, on the basis of the position of the point for fixing to the ground, with respect to the position to which the system S is fixed.

The modules of all the embodiments described above can be transported individually into the mobile configuration.

Moreover, for all the embodiments described above, the dimensions of said upper platform 60 and lower platform 61 are variable; generally, the larger the dimensions of said upper platform 60 and lower platform 61 the greater will be the angle of rotation carried out by said upper platform 60 and lower platform 61 during their mutual rotation, and, consequently, the greater will be the angle of rotation described by said load-bearing structure 1.

The operation of the systems S for emergency evacuation 1 described above is performed in the following manner.

When it is necessary to evacuate a building P, said emergency evacuation system S is applied to a window F of the building P to be evacuated, by means of the hook 63 of said supporting means 6, in the mobile mode.

More specifically, said hook 63 is applied to the sill of the window F, in such a way that the lower platform 61 is positioned at the window F itself.

In the fixed mode, said lower platform 61 is integral to said building P and is therefore already present at the evacuation area.

Alternatively, the lower platform 61 is rested on the cage of the Fire Service vehicle ladders and the slide 4 is suitably oriented making it rotate about said pin 62, depending on the obstacles surrounding the building P to be evacuated.

Subsequently, by activating said pneumatic inflation system 5, said modules $M_1$-$M_n$, $M'_1$-$M'_n$ of the slide, starting from the first and, selectively, also the next ones, start to inflate extending vertically towards the ground, allowing said slide 4 to extend.

The inflation allows the inflating selectively and in succession of the various modules $M_1$-$M_n$, $M'_1$-$M'_n$.

The inclination of said slide 4 with respect to the ground depends on the number of modules $M_1$-$M_n$, $M'_1$-$M'_n$ inflated.

The greater the number of modules present in said system S, S', S'', S''', $S^{iv}$ which are inflated, the less will be the inclination of said slide 4 with respect to the ground, thus resulting in a sliding which is less traumatic for the persons to be rescued.

Once all the modules $M_1$-$M_n$, $M'_1$-$M'_n$ have been inflated, it is possible to fix the load-bearing structure 1 to the ground by said coupling elements 7 and said means for anchoring to the ground.

The fourth embodiment of the system $S^{iv}$ differs in the operation described above, solely in that, once the modules $M'_1$-$M'_n$, are inflated separately, they are coupled together by means of said coupling elements 7 until reaching the suitable length which allows the distance from the ground of a window or balcony of the building P to be evacuated to be covered.

As is evident from the above-mentioned description, the system S, S', S'', S''', $S^{iv}$ described allows the selective inflation of the various modules $M_1$-$M_n$, $M'_1$-$M'_n$, in such a way as to adapt the dimension of the system S to the height of the building P to be evacuated, and also comprises means 6 for supporting on said building P to be evacuated so it is possible to orient the system S, on the basis of the conditions surrounding the building P to be evacuated.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. A system for emergency evacuation of persons from a structure comprising a building, ship, raised platform, or stadium, the system comprising:
   supporting means, designed to be located at a window of said structure for the emergency evacuation from said structure; and
   at least one load-bearing structure coupled with said supporting means, said load-bearing structure comprising:
      a plurality of modules, each comprising two inflatable longitudinal tubular elements positioned parallel to each other, said modules being positioned in series to each other, wherein each module comprises at least two inflatable transversal tubular elements positioned parallel to each other;
      a slide having a surface on which the persons evacuated from said structure can slide, said slide being interposed between said two inflatable longitudinal tubular elements of said modules; and
      a pneumatic inflation system for the selective inflation of said two inflatable longitudinal tubular elements of said modules, wherein:
         each of the inflatable longitudinal tubular elements comprises an inflation valve configured to be connected to said pneumatic inflation system; and
         each of the inflatable transversal tubular elements comprises another inflation valve configured to be connected to said pneumatic inflation system.

2. The system according to claim 1, wherein said slide comprises a plurality of portions, each portion being positioned between the respective inflatable longitudinal tubular elements, each module being connected to the next by coupling elements comprising at least one of rings, hooks, or Velcro elements fixed to each inflatable transversal tubular element.

3. The system according to claim 1, wherein said coupling elements configured to be fixed to the ground by anchoring means comprising nails or weights.

4. A system for emergency evacuation of persons from a structure comprising a building, ship, raised platform, or stadium, the system comprising:
   supporting means, designed to be located at a window of said structure for the emergency evacuation from said structure; and
   at least one load-bearing structure coupled with said supporting means, said load-bearing structure comprising:
      a plurality of modules, each comprising two inflatable longitudinal tubular elements positioned parallel to each other, said modules being positioned in series to each other, wherein each module comprises at least two inflatable transversal tubular elements positioned parallel to each other;
      a slide having a surface on which the persons evacuated from said structure can slide, said slide being interposed between said two inflatable longitudinal tubular elements of said modules, said slide comprises a plurality of portions each portion being positioned between the respective inflatable longitudinal tubular elements, each module being connected to the next by coupling elements comprising at least one of rings, hooks, or Velcro elements fixed to each inflatable transversal tubular element; and
      a pneumatic inflation system for the selective inflation of said two inflatable longitudinal tubular elements of said modules,
      wherein said coupling elements are configured to be fixed to the ground by anchoring means comprising nails or weights.

5. The system according to claim 4, wherein said slide extends from a first module of the plurality of modules on said successive modules uninterruptedly.

6. The system according to claim 4, wherein for each module, said two inflatable longitudinal tubular elements and said two inflatable transversal tubular elements are in communication with each other.

7. The system according to claim 6, wherein each module comprises supporting elements positioned on the rear surface of the slide, communicating with said two inflatable longitudinal tubular elements and said two inflatable transversal tubular elements.

8. The system according to claim 4, wherein said pneumatic inflation system comprises at least one cylinder comprising an inflating fluid and at least one electronic unit for controlling the dispensing of said inflating fluid.

9. The system according to claim 4, wherein:
said slide is made of fireproof material; and
said load-bearing structure may be surrounded either entirely or partially by a cover made of fireproof material, said cover separate from the slide.

10. The system according to claim 4, wherein:
each of the inflatable longitudinal tubular elements comprises an inflation valve, which configured to be connected to said pneumatic inflation system; and
each of the inflatable transversal tubular elements comprises an inflation valve, which configured to be connected to said pneumatic inflation system.

11. The system according to claim 4, wherein:
each of the inflatable longitudinal tubular elements of a first module of the plurality of modules comprises an inflation valve, which configured to be connected to said pneumatic inflation system;
each of the inflatable transversal tubular elements of the first module of the plurality of modules comprises an inflation valve, which configured to be connected to said pneumatic inflation system;
between each of the inflatable longitudinal tubular elements of the modules after the first module is interposed a passive inflating valve, designed to open after a predetermined pressure threshold is exceeded to allow the sequential inflation both of said inflatable longitudinal tubular elements and said inflatable transversal tubular elements; and
said pneumatic inflation system is configured for inflating in a selective manner said plurality of modules in succession one after the other, starting from said first tubular module.

12. The system according to claim 4, wherein said slide comprises a plurality of portions each portion being positioned between the respective inflatable longitudinal tubular elements, each module being connected to the next by coupling elements comprising at least one of rings, hooks, or Velcro elements fixed to each inflatable transversal tubular element.

13. The system according to claim 4, wherein said supporting means comprises:
an upper platform configured to be fixed to said load-bearing structure; and
a lower platform configured to be coupled to said upper platform.

14. The system according to claim 13, wherein said lower platform is configured to be coupled to said upper platform by means of rotatable coupling elements.

15. The system according to claim 14, wherein said rotatable coupling elements comprise a pin fixed on said upper platform.

16. The system according to claim 13, wherein said supporting means comprises a hook configured to be coupled to said lower platform for the resting of said system on said structure.

17. The system according to claim 13, wherein said lower platform is integral with said structure.

18. The system according to claim 4, wherein said slide comprises a plurality of portions, each portion exceeding in length relative to the respective inflatable longitudinal tubular elements and comprising a coupling element configured to couple to the next module, said coupling element comprising Velcro.

* * * * *